June 25, 1946.　　　　R. S. OHL　　　　2,402,839
ELECTRICAL TRANSLATING DEVICE UTILIZING SILICON
Filed March 27, 1941　　　3 Sheets-Sheet 1

INVENTOR
R. S. OHL
BY
E. V. Griggs
ATTORNEY

June 25, 1946. R. S. OHL 2,402,839
ELECTRICAL TRANSLATING DEVICE UTILIZING SILICON
Filed March 27, 1941 3 Sheets-Sheet 2

INVENTOR
R. S. OHL
BY
E. V. Griggs
ATTORNEY

INVENTOR
R. S. OHL
BY
E. V. Griggs
ATTORNEY

Patented June 25, 1946

2,402,839

UNITED STATES PATENT OFFICE 2,402,839

ELECTRICAL TRANSLATING DEVICE UTILIZING SILICON

Russell S. Ohl, Little Silver, N. J., assignor to Bell Telephone Laboratories, Incorporated, New York, N. Y., a corporation of New York Application March 27, 1941, Serial No. 385,425

22 Claims. (Cl. 250—30)

This invention relates to electrical translating devices utilizing silicon. More particularly, it relates to devices using silicon of high purity for modifying the frequency or wave form of electrical oscillations. Important applications of such devices are for modulating, demodulating, or rectifying electrical oscillations and for producing harmonics of fundamental frequency oscillations.

An object of the invention is to provide a simple rugged efficient and inexpensive electrical translating device of the point contact type capable of efficient operation at frequencies of the order of ten centimeter wave-lengths and shorter.

An additional object of the invention is the provision of an electrical translating device for extremely low amplitude oscillations in which the introduction of noise in consequence of the operation of the translating device shall be as little as possible.

An additional object of the invention is to increase the effectiveness of asymmetrically conducting translating devices of the solid body surface point contact type by reducing the resistance of the back contact of the body.

An additional object of the invention is to enable the construction of silicon surface contact translating devices which shall have predeterminable transmission characteristics.

Another object of the invention is to provide a stable demodulating system for oscillations of such high frequencies that electron discharge devices of the conventional types are ineffective.

An additional object of the invention is utilization of an ingot of silicon to produce as many electrical translating devices of given dimension as possible.

Hitherto the technique of electromagnetic wave reception has centered very largely about the electron discharge device which long ago superseded the early contact rectifiers or detectors of the general types developed by Dunwoody and Pickard in which the asymmetric conducting property of a contact between a metallic point and the surface of a so-called semiconducting body is utilized. This change in radio reception practice was brought about by many factors, among which are the amplifying property of the electron discharge device which enables the weak incoming energy to be amplified and low detection efficiency to be overcome, the high stability of the electron discharge device and the simplicity with which it lends itself to coupling to tuned or selected circuits.

As the art of transmission of electromagnetic waves progresses in the direction toward higher frequencies a point is reached at which the usual electron discharge device becomes comparatively ineffective. This point, which is somewhere in the region of 1000 megacycles is set by inherent factors in the operation of these electron discharge devices such as the capacitance of the input circuit and the appreciable transit time of electrons as measured in cycles of the extremely high frequency oscillations.

A study of contact rectifier type detectors as possible alternatives for the electron discharge device indicates that a number of characteristics are highly desirable in a substance a body of which is to be used as a contact detector. Of course, a very important consideration is the rectifying property which depends upon the ratio of front-to-back resistance, that is, the ratio between the current which passes when a given unidirectional electromotive force is impressed across the detector and the current which passes when that same electromotive force is applied in the reverse direction. Stability of the rectifying contact is also important and this in turn depends upon the chemical inertness of the materials used and the mechanical design of the contacting elements. Another important feature is that the body possess a sufficiently low specific resistance.

A contact rectifying device may, under certain conditions, be regarded as an asymmetric rectifier with a shunt path comprising series resistance and capacitance. The shunt path causes a decrease in sensitivity and a change in the exponential response characteristic as the frequency is increased beyond certain limits. In general, the current passed by such devices increases as an exponential function of the increasing voltage. When an alternating electromotive force is applied the rectified current may, for practical purposes within relatively low ranges of applied electromotive force, be regarded as varying as the square of the applied voltage. This is quite satisfactory for signal detection or for measurement purposes.

The high frequency limit at which a contact rectifier remains effective depends upon the area relations at the rectifying contact. For instance, if a point contact be made at an area which is wholly active, a very desirable characteristic may be obtained. If, on the other hand, the contact be made at an area which is partly active and partly inactive, the inactive portion will introduce an effective shunt path thus decreasing the sensitivity of the device as a whole. It is, therefore, important that devices of this type be constructed from materials having surface areas which are as nearly wholly active as possible.

Another characteristic of interest in the performance of detectors of the contact rectifier type is the noise introduced by the detector. This is dependent upon the particular substance employed and also upon the amplitude of the currents to which the detector is subjected. For example, if a superheterodyne system with a beating oscillator is employed, the noise increases with the input of beating oscillations in such a way that for low levels of oscillation current the signal gain due to the increasing amplitude of the beating oscillations is more rapid than the increase in noise whereas for high levels of oscillation currents, the signal gain with increase of the beating oscillations is small but the noise increase is large.

Another important factor in the production of noise in the operation of a rectifying contact detector is the character of what we may term the "back contact." This is the contact which the semiconductor body makes with the matrix of conducting material in which it is commonly embedded. If the back contact is somewhat imperfect the noise factor is high. If, on the contrary, the back contact is made with a matrix of conducing material which forms a substantially integral mass with the semiconductor the noise is greatly reduced.

It has been found necessary not only to take into account the character of the semiconductor body with which the contact is formed but, also, to employ a metallic point contact element which possesses certain characteristics. The point contact member should be inert chemically so that no oxide forms on its surface which might make possible a non-rectifying stable metallic contact. The point contact member if of the spring wire or catwhisker type must be ductile so that small wires of it are available and it must be strong and flexible enough to provide a contact having a steady pressure. Whatever its form it should provide a chemically stable contact which is maintained at a steady pressure.

Accordingly, an additional object of the invention is to provide a metallic point contact with which it may be possible to assure unchanging contact pressure with the surface of the semimetallic body and to fix the pressure of the contact at any desired magnitude.

It should be appreciated that the various characteristics and desirable properties which have been presented must, for practical use in the reception of millimeter-length waves, be attained in an apparatus of physical dimensions suitable for the reception of such waves and which is, therefore, of extremely small dimensions. This is for the reason that for transmission in this frequency range coaxial circuits and wave guides may be used in which it is frequently desirable to place the translating device within the coaxial line or wave guide. The small physical dimensions which may be given the contact element translating device make it ideal for this purpose. Moreover, the minute dimensions of the device and its supports enable any undesirable shunt capacitances associated with the device to be kept very small so that the transmission properties of a coaxial circuit or other high frequency oscillation transmitting system are not too adversely affected by a shunt connection of such a translating device.

In a study of electrical translating devices employing silicon applicant discovered that a remarkable improvement in the point contact rectifying characteristic and other electrical properties is attainable if resort be had to silicon of a high degree of purity, for example, of the order of at least 99 per cent. However, silicon of that purity has not been available in the market in chunks of sufficient size to serve for electrical translating devices. There is on the market silicon in granular form of a purity of about 99.85 per cent produced by the Electrometallurgical Company. Processes for producing such granular silicon are described in United States Patent 1,386,227 issued August 2, 1921 to F. M. Becket. N. P. Tucker of the British National Physical Laboratory has described an alternative process in the Journal of Iron and Steel Institute, vol. 15, page 412, 1927. Eimer and Amend have also supplied highly pure silicon in powder form.

In order to obtain bodies of highly pure silicon of sufficient size for electrical translating devices one may melt together a charge of the high purity granular or powder silicon material such as has been described. Because of the high melting point (1410° C.±10°) of silicon and the strong affinity which silicon has for oxygen the silicon must be melted under non-oxidizing conditions. Applicant discovered that the internal physical structure of silicon ingots so produced is by no means homogeneous and that the electrical characteristics of the material are likewise not uniform but on the contrary undergo striking variations from one region to another. For example, a small block of material cut at one point may pass electrons readily only in the direction from a metallic point to the block while a similarly shaped block cut at another location in the ingot passes electrons readily only in the direction from the block to the metallic point. Moreover, at a point somewhere between the positions of the blocks a very different internal asymmetric condition exists along a relatively thin interior surface or boundary. For convenience, a region of the block which passes current readily only when the block is positive may be designated as a "P zone," one in which the block passes current readily only when the block is negative, an "N zone" and the intervening internal asymmetric boundary region or surface a "barrier" zone or barrier surface.

In accordance with this invention, small bodies of high purity silicon cut from such portions of the ingot as to have the desired characteristics are utilized as the semi-conducting members in asymmetric electrical translating elements, as for example, high frequency contact detectors, modulators, rectifiers, or harmonic generators. Such detectors exhibit a loss of the order of 15 decibels less than that of previously known commercial silicon detectors. They are found to exhibit a high ratio of front-to-back resistance, to be chemically stable and to lend themselves readily to an electroplating for the back contact. They are relatively free from contact noise and if cut from the N zone are of relatively low specific resistance.

Fig. 16 is a schematic of the circuit of a system for producing harmonics using a translating element in accordance with the invention.

It has long been known that bodies of the class of materials known as semiconductors, including silicon, may be utilized for contact detectors for electrical oscillations. Examples of such contact detectors are those of U. S. Patents to G. W. Pickard 836,531, November 20, 1906, and 888,191, May 19, 1908. In an article at page 1003 of the Electrical World, November 24, 1906, Pickard states that after a trial of a large number of elements and compounds pure silicon was found very satisfactory as a rectifying contact detector. In U. S. Patent 1,698,668, issued January 8, 1929 to Ballantine and Hull, reference is made to the use of refined silicon. As a matter of fact the commercial "pure silicon" available to Pickard and the "refined" silicon of Ballantine and Hull were substances of about 98 per cent purity at most with at least 2 per cent of impurities. More recently, there has become available on the market the small particle silicon, to which reference has been made, of a very high purity of the order of 99.5 per cent.

The granulated high purity silicon now available on the market is produced by crushing material found in a large commercial melt. That supplied by Electrometallurgical Company is of a size to pass a 30 mesh screen and to be retained by an 80 mesh screen. The crushed material is purified by treatment with acids until it has attained a purity considerably in excess of 99 per cent. The chemical composition of a typical sample of this material is approximately:

| | |
|---|---|
| Si | 99.85 |
| C | .019 |
| Fe | .031 |
| Al | .020 |
| Ca | .003 |
| N | .008 |
| O | .061 |
| H | .001 |
| Mg | .007 |
| P | .011 |
| Mn | .002 |

In some samples amounts of up to .03 Ti and .004 Cr have been found.

An investigation of the metallurgy of high purity silicon has been made by J. H. Scaff. Based on the discovery that the P zone consists of material first to cool and the N zone of material last to cool a process has been evolved by which high purity silicon ingots may be produced with a barrier region surface which substantially divides the ingot into two unlike portions, one of which is P zone and the other N zone material. This process is disclosed and claimed in the application of J. H. Scaff Serial No. 386,835, filed April 4, 1941 for Preparation of silicon materials.

In accordance with the process the granulated material is placed in a silica crucible and is then fused in an induction furnace in high vacuum or in an atmosphere of helium. Because of a tendency to evolution of gas with ensuing violent turbulence of the material, it is desirable to raise the temperature to the melting point by heating the charge slowly. The use of shallow wide mouth crucibles for containing the silicon charge to be fused alleviates this condition but it may also be desirable to effect the fusion in an atmosphere of inert gas such as helium or hydrogen at atmospheric pressure. The temperature of the melt is raised to about 150° C. to 200° C. above the fusion point, that is, to about 1600° C. The power supplied to the induction furnace is reduced to permit the melt to cool slowly and at a rate not in excess of 150° per minute until the mass has a thick coating on the outside at a temperature of 1250° to 1200° C. Thereafter the heating power may be withdrawn to permit the silicon mass to cool rapidly.

Figure 1:
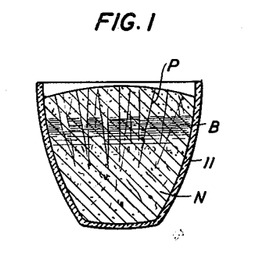
Fig. 1 illustrates the structural characteristics of a high purity silicon ingot utilized in constructing translating devices according to this invention.

The resulting ingot illustrated in Fig. 1 in the crucible 11 in which it was formed differs from a body of commercial silicon in that it is mechanically strong and free from cracks and blowholes. When highly polished it has a lighter grey color than the commercial material. The material of the ingot possesses physical characteristics which vary with distance from the upper surface. The portion first to cool, adjacent the upper surface in the crucible 11, is of a vertically columnar structure as indicated. Beyond the columnar structure is a non-columnar formation which is characterized by tiny gas pockets and, when sectioned, by an odor similar to that of acetylene. This non-columnar material is more greyish and has much smaller crystals than the material at the top of the ingot.

While the purity of this material is very high, in fact considerably higher than silicon heretofore obtainable in pieces large enough for electrical purposes, it does contain from about .1 per cent to .2 per cent of a variety of other elements. In the crystallization which ensues after the temperature of the melt is permitted to fall, a non-uniform distribution of impurities is obtained and it is this difference in impurity concentration which is believed to influence the physical properties of the silicon so that samples cut from various portions of an ingot exhibit different structural and electrical characteristics. It appears probable that a very small percentage of silicon carbide plays a very important role.

The material of the ingot is also not homogeneous in its electrical characteristics but consists of three fairly well defined zones. The upper portion which is first to cool develops a positive electrothermal potential against copper. This P zone portion as indicated in Fig. 1 extends to a second zone, the barrier zone, which is designated by B. The specific resistance of P zone material is considerably higher than is that of ordinary commercial silicon. In the barrier zone the specific resistance rises very abruptly to magnitudes a hundred times those near the upper surface of the P zone. Beyond the barrier zone the material is of N zone type. Its average resistivity is much lower than that of the other two zones and perhaps one-third the average resistance of the P zone material.

The ingot is strong enough that it does not crumble when cut into small pieces as does commercial silicon. When a small metallic point is placed in contact with the surface of a block of the material the contact is found to have very marked asymmetric properties. We may arbitrarily designate as the resistance of the combination of silicon block and the metallic point, the slope of the current voltage curve of the rectifying device for 1 volt applied electromotive force directed in the low resistance direction. The ratio of the current to that obtained with the electromotive force reversed may be designated as the front-to-back ratio. In a general way, the characteristics of the material may be tabulated as follows, the front-to-back ratios being obtained by measurements with 1 volt impressed electromotive force:

| Impedance | Pass current at 1 volt | Front-to-back ratio at 1 volt |
|---|---|---|
| Low | 7 to 30 milliamperes (140 to 33 ohms) | 5 to 50 |
| Medium | 2 to 7 milliamperes (500 to 140 ohms) | 10 to 100 |
| High | Below 2 milliamperes (more than 500 ohms). | 1 to 1,000 |

It will be understood that while the barrier surface or layer is at times extremely thin it in general appears to comprise a number of roughly parallel boundary surfaces closely spaced from each other. The barrier zone is not particularly satisfactory for point contact detectors since its direction of rectification is apt to be indeterminate depending upon the spot on its surface with which the metallic point makes contact. As has been stated, the specific resistance of barrier zone material is high relative to that of the other two zones. The barrier zone has very remarkable asymmetrically conducting, photoelectric and thermoelectric properties. A slab of the highly pure silicon ingot divided by the barrier into portions may constitute an alternating current rectifier if each portion be provided with an electric terminal. This is disclosed and claimed in the application of R. S. Ohl Serial No. 381,273, filed March 1, 1941 for Improvement in alternating current rectifiers. The use of a body of the high purity silicon material including a barrier surface which may be exposed to light to serve as a photoelectric device is disclosed and claimed in the application of R. S. Ohl Serial No. 395,410, filed May 27, 1941 for Light sensitive electric devices. The thermoelectric property of a body of high purity silicon which includes the barrier surface is disclosed and claimed in the application of R. S. Ohl Serial No. 438,645 filed April 11, 1942 for Thermoelectric device.

Figure 2:
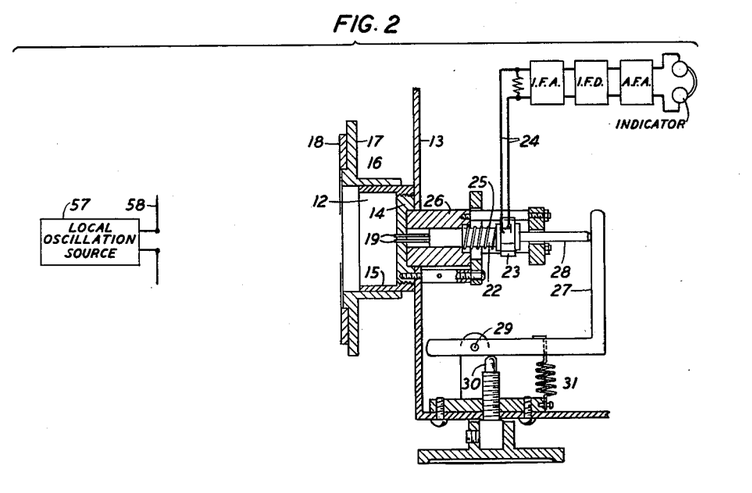
Fig. 2 illustrates one form of radio frequency selective and detecting apparatus employing the detector of this invention.

Fig. 2 shows the details of a radio receiving apparatus for very short waves. Such a receiving apparatus is disclosed and claimed in Patent 2,378,944 to R. S. Ohl issued June 26, 1945 resulting from application Serial No. 286,530, filed July 26, 1939 for Detector system for very short electric waves, of which the present application is a continuation in part. A chamber 12 carried on the conducting casing 13 comprises a centrally apertured conducting back plate 14 of circular contour threaded at its outer periphery to engage with a cylindrical conducting shell 15. Mounted telescopically on the shell 15 is an annular conducting cap member 16 which may be used to extend the chamber 12 in the longitudinal direction to adjust or tune the system to respond most effectively to oscillations of a given wave-length. At its open outer end the cap 16 is provided with a radially projecting flange 17 on which is mounted an iris 18. Projecting through the central aperture of plate 14 is a pair of lecher conductors 19 which serve as a pick-up antenna or electromagnetic wave energy absorber. By suitable adjustment of the iris 18 the area of the opening into the chamber 12 may be fixed to cause a maximum quantity of energy of the oscillations of the selected wave-length to be absorbed by the lecher conductors.

Figure 3:
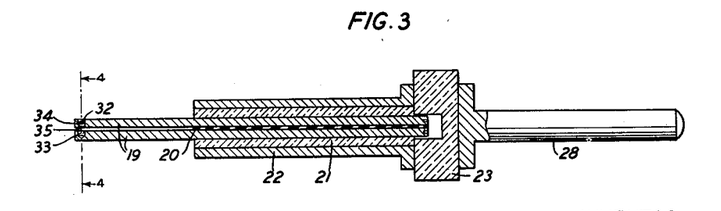
Fig. 3 illustrates details of the lecher circuit constituting the receiving antenna of Fig. 2.

The lecher conductors 19 are electrically separated by a strip 20 of mica or other dielectric material as illustrated in Fig. 3. A tubular sleeve 21 of dielectric material surrounds the lecher conductors very closely to hold them firmly clamped together as a unit and is in turn enclosed in a tightly fitting metallic tube 22 a flanged end of which is attached to an enlarged circular dielectric block 23 having an opening at one side through which pass the leads 24 that connect the lecher conductors to the external circuit. A helical spring 25 confined between the flanged end of tube 22 and a hollow guide 26 in which the tube 22 slides urges tube 22, the block 23 and the entire lecher circuit assembly to the right to withdraw it from the chamber 12. The position of the lecher conductors is determined by a bell crank 27 bearing against the reaction bolt 28 and hinged at 29. The position of the bell crank is fixed by the adjusting screw 30 and the retracting spring 31. It is, therefore, possible to nicely adjust the position of the lecher conductors with respect to chamber 12. The aperture of the back plate 14 through which the lecher conductors 19 project is such that the back plate 14 is spaced from the lecher conductors just sufficiently to prevent its acting as a short-circuiting path for intermediate frequency oscillations. The capacitance between the back plate 14 and the conductors of the lecher circuit is, however, sufficient so that the lecher circuit is effectively terminated for millimeter-length waves at that face of the back plate which is adjacent the chamber 12. In practice the lecher system is tuned by operation of the screw 30 to one-quarter wave-length or three-quarters wave-length as indicated by maximum response indications. The chamber 12 is adjusted in length to a multiple of a half wave-length as indicated by an incoming signal maximum. Finally the iris 18 is adjusted to obtain the most favorable impedance condition.

Figure 4:
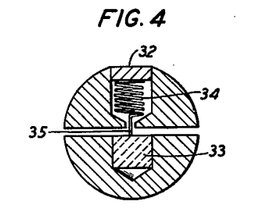
Fig. 4 is an enlarged sectional view in the plane 4—4 of Fig. 3 showing details of the detector.

Fig. 4 which is a section in the plane 4—4 of Fig. 3, shows the structure of the contact rectifier-detector. It consists of a cylindrical block 33 of fused high purity silicon seated closely in a circular recess in one of the lecher conductors. The other lecher conductor is provided with an opening in which is inserted a spring 34, the end 35 of which presses down on the polished surface of the block 33 to make the rectifying contact. The spring 34 is held in position by a small plug 32 of electrically conducting material, fitting tightly in the opening and staked therein to secure the spring in position.

Since the detector is near the open end of the lecher system it is at a point of substantially maximum voltage. The semicircular lecher conductors 19 extend back through the casing 13 and the annular member 14, as has previously been explained, is so nearly in contact with them that it serves as a short-circuiting path for high frequency energy thus determining the electrical tuning frequency of the lecher circuit. Since the separation between the member 14 and the lecher conductors is sufficient to maintain them electrically separated at an intermediate frequency, intermediate frequency oscillations which result from interaction of the incoming high frequency oscillations and of any locally introduced oscillations will be transmitted by the lecher conductors to the leads 24 which pass out through the side of member 23.

The silicon body 33 may be ground to the desired shape and dimensions from a piece of the high purity silicon material which has already been described. The rough ground cylinder may be first cleaned with carbon tetrachloride and slightly etched in warm solution of potassium hydroxide. As an alternative it may be cleaned electrolytically by a hydrogen wash in a strong alkaline solution. After cleaning, rhodium may be electroplated on the silicon in accordance with a process described in connection with Fig. 5. This results in a material reduction of the noise components introduced by the silicon body. After the electroplating the cylinder may be placed in a suitable chuck in a spindle mounted for rotation. One end of the cylinder may be ground flat and free from metal with a fine mesh diamond wheel. If the mesh of the wheel is not sufficiently fine the end surface may be polished with a mixture of a very fine air-separated aluminum oxide dust mixed with SAE 20 engine oil. This produces a surface of a high polish. The polished surface may then be employed for contact rectification in conjunction with a point contact element.

The spring contact member 34 of Fig. 4 preferably consists of tungsten wire having its surface, and particularly its tip portion, coated with highly conducting material such as the alloy of gold, silver and platinum disclosed in U. S. Patent 937,284, issued October 19, 1909, to E. B. Craft and J. W. Harris, which is known as No. 1 contact metal, or with a platinum and iridium alloy. A contact wire of platinum-iridium alloy may also be used.

In an actual apparatus constructed in accordance with the disclosures of Figs. 2, 3 and 4 and designed to operate for reception of oscillations of 4 to 19 millimeters wave-length, the two semicircular section lecher conductors 19, consisting of No. 1 contact metal, with their intervening mica strip 20 had a diameter of .053 inch. The silicon crystal employed as the element 33 of Figs. 3 and 4 was of cylindrical form with a diameter of .0173 inch and with a length equal to its diameter. The contact spring 34 was formed of seven or eight turns of .0009 inch diameter pure tungsten wire, gold plated. This spring was wound on a form so made that a straight piece protruded from one end of the spring. This end was cut off with a small scissors.

The end surface of the block 33 of the rectifier contact device against which the spring 34 bears is, as has been explained, highly polished and relatively large. The smooth surface reduces the effect of distributed capacity and makes it much simpler to search for an effective rectifying contact area in adjustment of the apparatus. The contact resistance between the silicon cylinder and its supporting lecher conductor is reduced to a minimum by an aquadag coating on the cylinder. The tungsten spring wire 34 is carefully ground at the base end of the coil to have a large flat surface which may contact with the plug 32 at its base. The tungsten material of the spring wire 34 has sufficient torsional elasticity at the very small wire diameters employed to exert sufficient pressure on the crystal block to effect and maintain a satisfactory rectifying contact. The pressure, although not particularly critical, is, in general, so adjusted as to be of the order of 2.5 kilograms per square millimeter.

The incoming oscillations received in chamber 12 may be superposed therein upon local oscillations supplied in any desirable manner as, e. g., from the local oscillation source 57 with its radiating antenna 58 as indicated in Fig. 2. The lecher conductors 18 pick up corresponding oscillation electromotive forces and impress them upon the detector 33, 34, 35. The intermediate frequency currents resulting from the operation of the detector may then be impressed by leads 24 upon the remaining portion of the radio receiving system comprising, in tandem, the usual intermediate frequency amplifier IFA, intermediate frequency detector IFD, audio frequency amplifier AFA and loudspeaker or other type of signal indicator.

Another method of preparing high purity silicon crystal contact rectifier-detector units in accordance with the invention is illustrated in Figs. 5, 6, 7 and 8. In accordance with this method a block 36 of approximately cubical form may be cut from the N zone of an ingot such as described in connection with Fig. 1. The bottom of the block is smoothed using an iron lap with 600 mesh or, 1000 mesh aluminum oxide, number 95 optical powder obtainable from the Carborundum Company, or Number M-302 optical powder obtainable from the American Optical Company. It is then lightly etched in a 25 per cent or 30 per cent solution of hot sodium hydroxide or potassium hydroxide. The etched surface of the block which was smoothed is then washed in distilled water and electroplated for a few minutes in a hot (60° C.) rhodium phosphate electroplating solution with a platinum anode at a current density just sufficient to discharge hydrogen, with the rhodium but not too vigorously. This is generally at a potential of about 3.2 volts although the potential is frequently higher if the internal resistance of the silicon is high. The plated surface may then be tinned with a soft solder using zinc chloride acid flux. The silicon block 36 is then sweated or soldered to a brass jig 37 which may be clamped in the cutting machine.

Silicon is a difficult material to solder or to which to make intimate electrical connections. Ordinary commercial silicon is particularly difficult in this respect and often cannot be soldered. With the high purity silicon material rhodium enables a very satisfactory joint to be made which does not loosen up. Moreover, rhodium plating is found to be very highly resistant to corrosion. Accordingly the use of rhodium for this purpose is an important feature of the process of preparing satisfactory electrical translating elements using high purity silicon.

Figure 5:
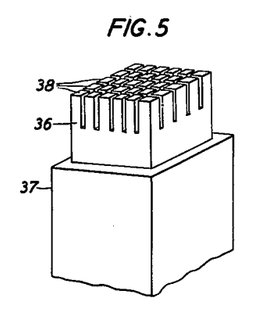
Fig. 5 illustrates a step in the formation of a plurality of detector units of rectangular cross-section.
Figure 6:
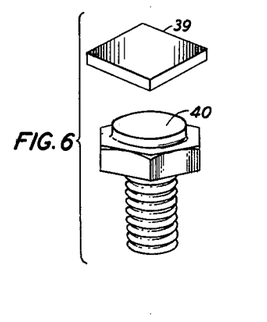
Fig. 6 illustrates a stage in the mounting of an individual detector unit upon a supporting screw.
Figure 7:
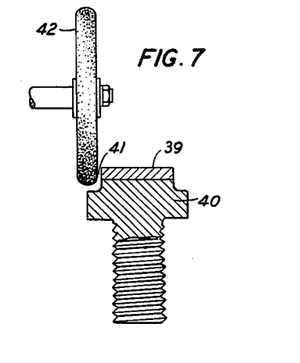
Fig. 7 indicates the manner of shaping the head of the detector unit.
Figure 8:
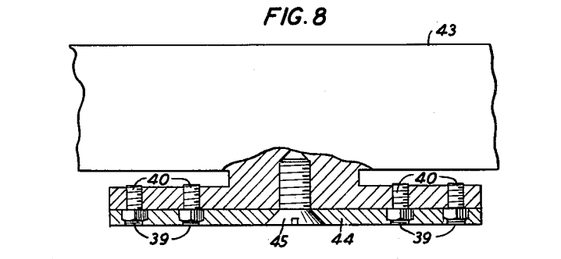
Fig. 8 illustrates the appliance for final grinding of the contact surfaces of a plurality of detector units.

The silicon block 36, formed as described, is then slotted crosswise as illustrated in Fig. 5 using a 1/64 inch thick metal wheel charged with diamond particles. A stream of distilled water is used to clear the cut particles from the kerf and to cool the surfaces. The cross slots produce pillars about 1/8 inch square firmly anchored on the soldered surface. The upper surfaces of the pillars are now ground flat on an iron lap, e. g., with 600 mesh aluminum oxide and are rhodium plated in accordance with the process previously described. Thin slabs are now sliced off the pillars by cuts perpendicular to the slots. This yields a plurality of thin square slabs 39 each rhodium plated on one flat face. Each of these slabs 39 is carefully soldered to the head of a brass screw 40 as indicated in Figs. 6 and 7. The screws are made from ⅛ inch hexagonal material, the heads being about 3/64 inch thick and very flat. The silicon slab to be soldered onto the head is about ⅛ inch square and .025 inch thick. The soldering may be easily accomplished by holding the two surfaces together having previously wetted the brass with zinc chloride acid flux. The screw is then heated on a hot place or soldering iron until the joint or bond is formed. The unit is immediately plunged in cold water which dissolves the excess flux. Each slab is screwed into a jig and then rounded at 41 using a diamond wheel 42 as shown in Fig. 7 with water cooling. A number of the units indicated in Fig. 7 are then screwed into a stainless steel jig 43 as indicated in Fig. 8. The jig may be circular and provided with threads so that it may be screwed into a threaded chuck. In actual operation such a jig has been used to grind twenty-four units simultaneously. A face plate 44 of a special abrasive resistant steel attached to the jig by a screw 45 supports the silicon detectors laterally and enables their tops to be simultaneously ground flat without undue rounding at the margins of the outer surface. A lead lap with 1000 mesh aluminum oxide optical powder is employed for this purpose. The powder may be applied from an Erlenmeyer flask in which it has been mixed with distilled water and about 1 per cent Ivory soap. The process is completed by the application of a water wash while applying considerable pressure to the jig containing the plurality of silicon units as it is being held on the lead lap with only the crushed abrasive charged in the lead acting as the cutting medium. The water wash is made of about 1 per cent Ivory soap solution and 5 per cent glycerine in distilled water. A final polish may be obtained using No. M-310 optical polishing rouge and a lead lap. The units are now washed with soap water and a brush. After cleaning away the abrasive they may be rinsed in clear water and dried on paper tissues. Each may then be screwed into a block of phenolic condensation material and a small amount of a freshly prepared 1 or 2 per cent solution of hydrofluoric acid in concentrated nitric acid is applied to the polished surface from a capillary tube. The acid is allowed to remain about 5 to 15 seconds and is then washed off after which the units are repeatedly cleaned in distilled water and dried. The surface is then ready for use.

Figure 9:
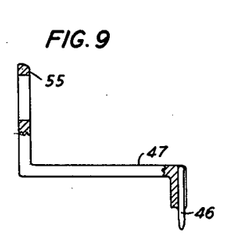
Figs. 9 and 10 are respectively side and front views of a detector contact element.
Figure 10:
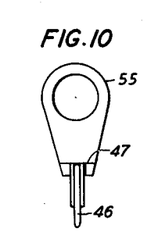

The metallic contact point which cooperates with the silicon body may consist of fine tungsten wire. Tungsten has the advantage of maintaining its resiliency under severe operating conditions. For this purpose a short section of tungsten wire, e. g., of .002 inch diameter, may be used. To enable the contacting end to be ground flat a bundle of tungsten wires, say, 10 to 100 strands, may be assembled and wrapped tightly with fine copper wire, after which the turns of copper wire are soldered tightly together and the whole assembly placed in a chuck in a lathe. The ends of the tungsten wires may then be ground flat with a resinoid bonded 600 mesh diamond wheel kept moist with a wet cloth. The soldered copper wire may then be dissolved in warm 20 per cent nitric acid. Each wire may then be dipped in molten No. 1 contact metal generously covered with borax. The temperature of the No. 1 metal should be so adjusted that a rounded end of the alloy is left on the tip of the wire which is to contact with the silicon material. The wire may then be cleaned in hot sodium or potassium hydroxide and washed in distilled water. The cleaned wire 46 is then spot welded at its other end to a coin silver supporting member 47 as illustrated in Fig. 9. The coin silver member is fashioned to a predetermined size from material rolled to a scleroscopic hardness of 65 to 70. In this way the pressure can be controlled by a measurement of the spring displacement when the contact is set up. Very desirable rectifying characteristics have been obtained with such a contact at a pressure of about 10 grams. A front view of the structure of Fig. 9 is shown in Fig. 10.

As an alternative to the tungsten contact wire with the alloy covered contact tip it has been found possible to use a wire consisting of a very fine wire of platinum-iridium alloy having its contact end surfaced flat. It is necessary, however, to have the silicon detector plate very smooth so that the hard wire may not mar its surface. This construction has the advantage that smaller contact areas may be had with the requisite strength of wire to sustain the contact pressure and the shunt capacitance across the contact is reduced, thus making the device effective for oscillations of 10,000 megacycles. The manufacturing cost is also reduced by the elimination of the No. 1 contact metal.

If desired, the platinum-iridium wire points may be given a smooth rounded contour. The wire to be treated may be set up under a microscope of 150 diameter magnification. A direct current arc is caused to play between the point as a cathode and a larger platinum anode. In the case of a .002 inch wire the current may be supplied at an electromotive force as high as 5000 volts through a 2 megohm resistance from a high voltage rectifier with an arc gap of about 1 millimeter between the platinum-iridium wire and the anode. As soon as the surface of the point is fused the power should be quickly turned off to prevent the formation of a globule of molten metal.

Figure 11:
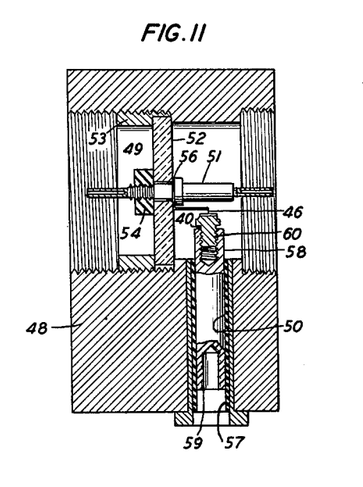
Fig. 11 illustrates a fixture serving to connect a high frequency input circuit and a heating oscillator to a detector and also to connect an intermediate frequency output path to the detector.

Fig. 11 shows a detector unit capable of use in a high frequency stage in which a local oscillator is employed. A brass block 48 through which a tubular aperture 49 passes also is provided with another tubular aperture 50 opening into the first. A centrally positioned conductor 51 is supported within the aperture 49 to constitute a coaxial system. The conductor 51 is provided with terminal jacks to permit a coaxial section to be connected at one end for the incoming high frequency waves and a second coaxial section to be connected at the other end for the beating oscillations from the local source. The conductor 51 is held in position by a centrally apertured insulator 52 clamped in place by a lock nut 53. A lock nut 54 fixes the conductor firmly in place with respect to the insulator. The apertured collar portion 55 of the detector contact support 47 is slipped over the conductor 51 between a circular flange 56 of the conductor and the insulator 52. Within the aperture 50 is threaded a sleeve 57 of polystyrene or other dielectric material within which is tightly fitted a central conductor 58 having a jack 59 at its outer end and an interiorly threaded aperture 60 at the opposite end to receive the supporting screw 40 of the silicon detector element.

It will be apparent that the high frequency contact detector is connected in series between the central conductors 51 and 58 so that the superposed incoming high frequency oscillations and the local oscillations may be impressed through the detecting unit in series with the capacitance across the polystyrene sleeve 57. However, that capacitance is sufficiently small to present a high reactance to the intermediate frequency oscillations to be transmitted along the coaxial system 50, 58.

Figure 12:
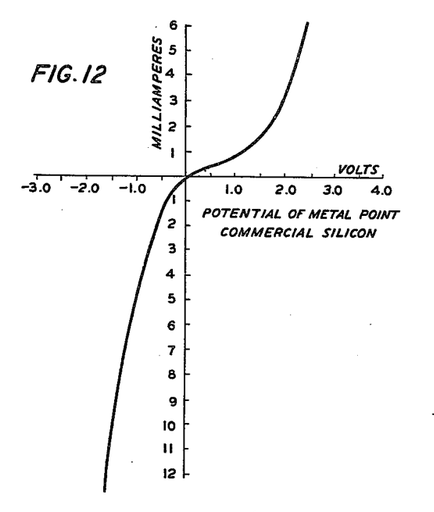
Fig. 12 is a graph illustrating the rectifying performance of silicon detectors of the prior art.

The performance of high purity silicon detectors constructed in accordance with the invention may be better appreciated from the graphs of Figs. 12 to 15, inclusive. Fig. 12 is plotted from the data for silicon steel contacts given by Austin at page 135, Bulletin of Bureau of Standards, 1908. These data were obtained from direct current measurements and indicate that the device passes relatively large currents in both directions even with small applied electromotive force.

Figure 13:
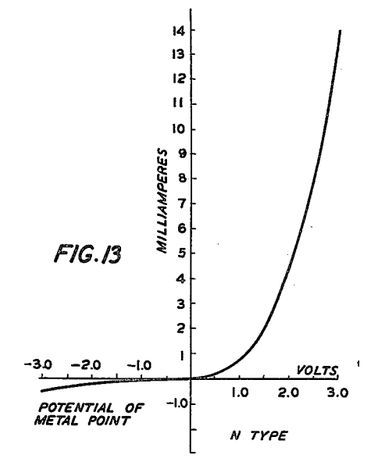
Figs. 13, 14 and 15 are similar graphs which show respectively the performance of an average N type detector as is obtained upon first contact, the same characteristic after the contact has been electrically "conditioned," and the characteristic of a P type detector.
Figure 14:
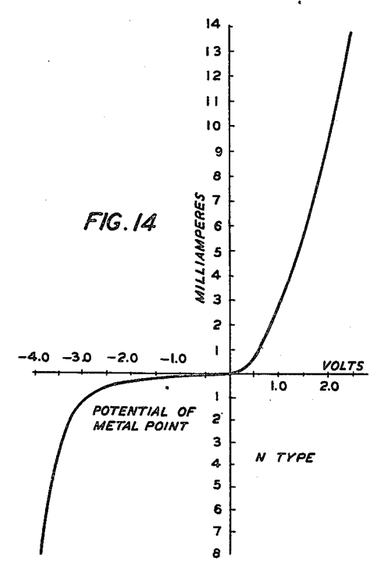
Figure 15:
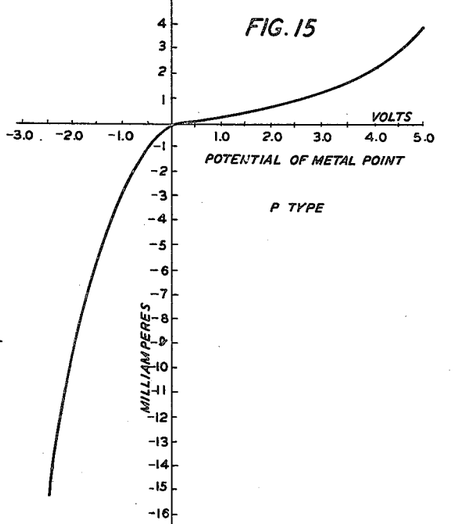

Figs. 13, 14 and 15 are based upon oscillographic records yielded in response to application of alternating electromotive forces to detectors constructed in accordance with this invention.

Fig. 13 illustrates the rectifying performance of an average type N unit as obtained upon first contact. The characteristic changes after the contact has been "conditioned" by discharging a comparatively large condenser through it. For example, after charging a 4 microfarad capacity from a 9 volt battery and discharging it in the low resistance direction through a contact the initial performance of which is represented by Fig. 13, the characteristic changed to that of Fig. 14. This conditioning procedure stabilizes the contact performance and reduces the impedance of the contact.

Fig. 14 represents the rectifying characteristic of a typical N type high purity silicon detector. For an alternating current electromotive force of 1 volt the positive half wave yields a considerable current and the negative half wave a current which is very nearly negligible. The greatest change of current for a given change of electromotive force in the 1 volt range under consideration occurs between about .3 volt and 1 volt. For impressed alternating electromotive forces of the order of 1 volt the rectified or direct current which results can be expressed roughly by the equation $I=KE^{7/2}$, where I is the rectified current and E the impressed alternating electromotive force. In fact the exponent of E is frequently greater than 7/2. This device, especially when it is used as a beat frequency detector, is therefore so effective in this range, i. e. for electromotive forces up to 1 volt, that very little gain and generally a small loss is made by increasing the impressed electromotive force beyond about 1 volt. In comparison with silicon contact rectifier-detectors of the prior art which exhibit a frequency conversion loss of the order of 20 decibels, the improved pure silicon N type detector of this invention occasions a loss of about 5 decibels. Such a device is particularly suitable as a first detector of weak incoming radio oscillations. Its relatively low specific resistance and its very great sensitivity are highly advantageous for such applications. Accordingly, when used as a beat frequency (or a first detector) it is found desirable to operate with the beating oscillator impressed electromotive force not in excess of a peak value of 1 volt. The low electromotive force also reduces detector current noise which, of course, is a function of the current which traverses the detector. Whereas in prior point contact detectors the current noise amounted to about 40 decibels above the thermal noise level of an equivalent resistance, in the N type detector unit of this invention the current noise may be less than 3 decibels above thermal noise and has indeed been frequently observed to be less than 1 decibel above the thermal noise of an equivalent resistance. This is obviously a very notable improvement. It may be observed that in respect to detector current noise the performance of this improved detector is better than has been obtained with detectors of the electron discharge tube type. In still another respect the possibility of operating effectively at low electromotive forces is advantageous. High impressed electromotive forces frequently have a tendency to cause pitting or production of minute craters at the highly polished surfaces of contact rectifier detectors. This is effectively avoided by the low electromotive force device of this invention.

Translating devices of the N type are also quite useful as modulators and harmonic producers. For such uses one is interested in higher power levels than in the case of first detectors. The fact that N type units can be selected to yield a very favorable front-to-back resistance ratio over a large range of electromotive force and at relatively high absolute electromotive forces renders them important in these fields. For odd harmonic prodution it may be desirable to impress a unidirectional bias electromotive force upon the N type harmonic producer. This may be accomplished by inserting a series condenser in circuit with the N type unit to cause it to develop a self-biasing electromotive force. The capacity of the condenser and the magnitude of the leak resistance in shunt to the condenser may be readily determined by trial. It may also be desirable to use a similar expedient to impress a small biasing electromotive force for detection of oscillations of electromotive forces of less than .3 volt peak magnitude in order to bring the detecting operation up to the knee of the rectifying characteristic.

Fig. 15 illustrates the rectifying performance of an average detector of the P type. The lower resistance P type detectors are useful in voltmeters and signal detection. Ordinarily they are not subjected to more than about 2 volts but in special cases as high as 12 volts effective alternating potential may be applied. P type detectors exhibit a rectifying characteristic at low electromotive forces which may fairly be represented by $I=K_iE^2$ where I is the direct current and E is the applied alternating potential. The P type rectifier characteristic is somewhat similar to that of the old commercial silicon rectifiers of the prior art but the P type rectifier possesses a greatly superior front-to-back resistance ratio and is, therefore, very much more efficient as an energy converter than the best silicon detector of the prior art. This "square law" type of characteristic is advantageous for measuring energy since the deflection of a direct current microammeter in circuit with such a device will be very nearly proportional to the alternating current power and, moreover, is effective for indicating rectified direct current electromotive forces of the order of $1/20$ volt. By the use of a sensitive galvanometer direct current voltages less than a millivolt can be measured. Such a device may readily be used for measurement of power at 30,000 megacycle frequently or one centimeter wave-length.

In sharp contrast to silicon contact detectors of the prior art the novel devices described are highly stable mechanically, chemically and electrically. Once adjusted the contact may remain effective for a period of a month without further attention. Indeed some experimental devices still in use have remained in operation for a very much longer period. This eliminates the need for delicate and expensive adjusting devices for repositioning the contact, which were essential in most of the prior art contact detectors. These detectors are effective throughout the entire range up to oscillation frequencies beyond 10,000 megacycles. Their output is of the order of 15 decibels higher than that obtainable with silicon detectors of the most efficient prior types and they are very much more free from current noise reducing it to less than 3 decibels above thermal noise.

Fig. 16 shows schematically a circuit for producing oscillations of odd harmonic frequencies of given fundamental oscillations. It comprises a source 67 of fundamental oscillations, an N type translating element 61, a transformer primary winding 62 and a condenser 63 all in series. As has previously been explained the condenser may serve together with the rectifying element 61 to develop the unidirectional biasing electromotive force desirable to enable the system to operate most efficiently as a harmonic producer. A high leak resistance 64 permits the bias to develop in response to the rectifying action. A selective circuit 65 including the primary winding of the transformer selects the desired harmonic and impresses it upon a load circuit 66.

Figure 17:
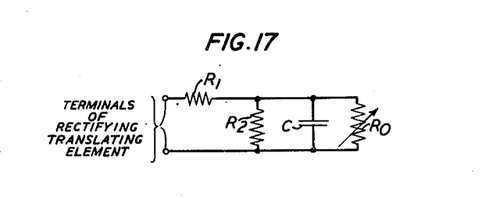
Fig. 17 is a schematic explaining certain aspects of design of translating devices in accordance with the invention.

The performance of a rectifying translating device of the type disclosed in this application and its most efficient design may be explained in part by reference to the circuit of Fig. 17 which is an approximately equivalent electrical circuit. $R_1$ represents the resistance encountered in the body of the silicon, $R_2$ the intrinsic resistance across the point contact measured at an exceedingly low impressed voltage. $R_0$ represents the variable resistance which is of principal interest in the performance of the translating unit and which is, of course, utterly non-linear in character. The capacity C is that at the point of contact between the metal point and the silicon surface. $R_3$ is the shunt resistance of all paths in the translating device by which current may pass without traversing the rectifying path through $R_0$. In use at high frequencies it is the objective to make $R_1$ as small as feasible. This is accomplished by making the silicon body very thin or choosing more highly conductive material or both. In certain applications the silicon body has been made only 1/500 inch thick with no sacrifice of other properties. The resistance $R_2$ which by-passes energy around the rectifying path of $R_0$ should be made as large as possible. This is largely a matter of the choice of materials, the finishing of the silicon surface, the contact point size and the contact point pressure. The capacity C is also dependent upon the contact point area. If the resistance of $R_1$ were zero the capacity C could be tuned out at very high frequencies but in practical design the most effective measure is to reduce the point diameter of the contact point. This immediately reduces the capacity correspondingly. It also reduces the likelihood of a contact which might otherwise exist with a minute poor rectifying point close to the point in use for the $R_0$ path. There is another practical advantage from the standpoint of manufacture, cost, and maintenance since with exceedingly fine wire such as can be produced of platinum-iridium alloy it is possible to avoid having to flatten the ends of the point contact wire. Such points have been produced of wires .002 inch in diameter and even as small as .001 inch. The very small points are highly desirable for use when oscillations of wave-lengths as short as 3 centimeters or less are involved.

What is claimed is:

1. An electrical translating device comprising a body of silicon of a purity in excess of 99 per cent and terminals electrically connected therewith for passing current therethrough.

2. An electrical translating device comprising a body of silicon of the order of 99.8 per cent pure and terminals electrically connected therewith for passing current therethrough.

3. An electrical translating device comprising a body of silicon of a purity of the order of 99.8 per cent and a rhodium plating on a portion of the surface thereof whereby a low impedance electrical contact to the silicon body may be effected.

4. An electrical translating device comprising a body of silicon of a purity of the order of 99.8 per cent, a rhodium plating on a portion of the surface of the body and a metallic electric conducting member soldered to the rhodium plating.

5. An electrical translating device comprising a body of silicon of a purity of the order of 99.8 per cent and a metallic point contact held against the surface thereof whereby the device may serve as a point contact rectifier of electrical oscillations.

6. An electrical translating device comprising a body of silicon of a purity of the order of 99.8 per cent which is thermally electropositive and terminals electrically connected therewith for passing electric current therethrough.

7. An electrical translating device comprising a body of silicon of a purity in excess of 99 per cent which is thermally electronegative and terminals electrically connected therewith for passing electric current therethrough.

8. An electrical translating device comprising a body of silicon of a purity of the order of 99.8 per cent which is thermally electronegative and terminals electrically connected therewith for passing electric current therethrough.

9. An electrical translating device comprising a body of silicon of a purity in excess of 99 per cent and electrical connections to said body for impressing thereon a signal modified oscillation electromotive force to be detected whereby current components of the modifying signal frequency may be derived in consequence of the rectifying action of the silicon body.

10. An electrical translating device comprising a body of silicon of a purity of the order of 99.8 per cent and electrical connections to said body for impressing thereon a signal modified oscillation electromotive force to be detected whereby current components of the modifying signal frequency may be derived in consequence of the rectifying action of the silicon body.

11. A rectifying contact detector for electromagnetic oscillations of millimeter wave-length range comprising a body of silicon of a purity in excess of 99.8 per cent, an electric conductor joined thereto by a contact which is large in area and very intimate, the body of silicon having one highly polished surface, a second conductor electrically connected to the body by a member having a point contact which is relatively small in area and which rests upon the polished surface with a relatively low pressure.

12. A rectifying contact detector for very short electromagnetic oscillations comprising a body of silicon containing more than 99 per cent silicon having one surface mechanically smoothed off to cooperate with a point contact element and a conducting member having a point in contact with the surface.

13. A rectifying contact detector element comprising a body of silicon of a purity in excess of 99 per cent having a smoothed surface to enable it to serve as a contact rectifier and having a back contact surface plated with rhodium to reduce noise currents.

14. A detector for electrical oscillations comprising a thin plate cut from a silicon ingot having a purity in excess of 99 per cent, the plate lying substantially parallel to the surface of the ingot which was first to cool and a metallic contact of small area engaging a surface of the plate.

15. A detector for electrical waves comprising a body cut from the N zone of an ingot of silicon of a purity in excess of 99 per cent and a metallic contact point in engagement with a surface of the body which is parallel to the barrier zone.

16. An electrical translating device which is effective at all frequencies in the microwave range comprising silicon crystal of high chemical purity and a fine contact wire making a resilient point-contact with the surface of said crystal, the effectiveness of said translating device over said range depending upon the high degree of purity of said crystal which exceeds 99 per cent.

17. A translating device for electrical waves comprising a thin plate cut from a silicon ingot having a purity in excess of 99 per cent, the plate lying substantially parallel to the surface of the ingot which was last allowed to cool, and a metallic contact of small area in engagement with the surface of said plate.

18. A translator for electric waves comprising a body cut from the P zone of an ingot of silicon of a purity in excess of 99 per cent, and a metal contact point in engagement with the surface of the body which is parallel to the barrier zone.

19. A translating device for electrical waves comprising a plate cut from a silicon body having a purity in excess of 99 per cent and having zones of different electrical properties, the characteristics of said device depending upon the zone at which said plate is cut, and a metallic contact element engaging the surface of said plate.

20. A translating device for electrical waves comprising a thin plate of fused and crystallized silicon of a degree of purity in excess of 99 per cent, said plate being selectively cut from a silicon ingot having zones of different electrical characteristics.

21. An electrical translating device comprising a body of crystalline silicon and a fine contact wire making a resilient point contact with the surface of said body, said silicon body having a purity in excess of 99 per cent to give said contact surface a high degree of uniformity and stability.

22. An electrical rectifying device for use in the microwave range comprising a silicon body having a contact surface and a fine contact wire making a resilient point contact with said surface, said silicon body having a purity in excess of 99.8 per cent for giving said surface a high degree of uniformity and contact stability.

RUSSELL S. OHL.